(12) United States Patent
Smith et al.

(10) Patent No.: US 12,725,069 B2
(45) Date of Patent: Sep. 1, 2026

(54) METHOD AND SYSTEM FOR ONGOING SPECTRAL FEEDBACK AND CONTROL DURING QUANTUM KEY DISTRIBUTION USING DATA ANALYSIS

(71) Applicant: Quantized Technologies Inc., Calgary (CA)

(72) Inventors: Jordan Daniel Smith, Calgary (CA); Daniel Oblak, Calgary (CA); Anuj Sethia, Calgary (CA); Hanen Chenini, Calgary (CA); Ashutosh Singh, Calgary (CA); Itzel Lucio Martinez, Calgary (CA)

( * ) Notice: Subject to any disclaimer, the term of this patent is extended or adjusted under 35 U.S.C. 154(b) by 0 days.

(21) Appl. No.: 19/104,969

(22) PCT Filed: Jul. 20, 2024

(86) PCT No.: PCT/IB2024/000370
§ 371 (c)(1),
(2) Date: Feb. 19, 2025

(87) PCT Pub. No.: WO2025/017367
PCT Pub. Date: Jan. 23, 2025

(65) Prior Publication Data

US 2026/0121843 A1 Apr. 30, 2026

Related U.S. Application Data

(60) Provisional application No. 63/527,960, filed on Jul. 20, 2023.

(51) Int. Cl.
*H04L 9/08* (2006.01)
*G06N 10/40* (2022.01)
(Continued)

(52) U.S. Cl.
CPC ............ *G06N 10/40* (2022.01); *H04B 10/70* (2013.01); *H04L 9/0858* (2013.01); *H04L 9/12* (2013.01)

(58) Field of Classification Search
CPC ...... G06N 10/40; H04B 10/70; H04L 9/0858; H04L 9/12
See application file for complete search history.

(56) References Cited

U.S. PATENT DOCUMENTS 9,473,301 B2 10/2016 Englund et al.
10,158,481 B2 12/2018 Bunandar et al.
(Continued)

FOREIGN PATENT DOCUMENTS

CN 103618597 A 3/2014
CN 106209361 A 12/2016
(Continued)

OTHER PUBLICATIONS

International Search Report and Written Opinion dated Nov. 12, 2024 on PCT/IB2024/000370.

*Primary Examiner* — Izunna Okeke
(74) *Attorney, Agent, or Firm* — Brunet & Co. Ltd.; Robert Brunet; Hans Koenig

(57) ABSTRACT

The present invention provides a quantum communication system and associated methods for securely establishing a cryptographic key between two or more transmitters and a receiver. Each transmitter emits qubit signals from a light source within defined time windows, characterized by specific bases and modes controlled by a transmitter controller. The receiver utilizes an interference device with multiple inputs to receive qubit signals and outputs to generate an interference signal, which is detected by multiple detectors. A receiver controller sends information on detected outputs to transmitters and provides feedback based on spectral characteristics. Simultaneously, the system adjusts subse-
(Continued)

Figure 1A:
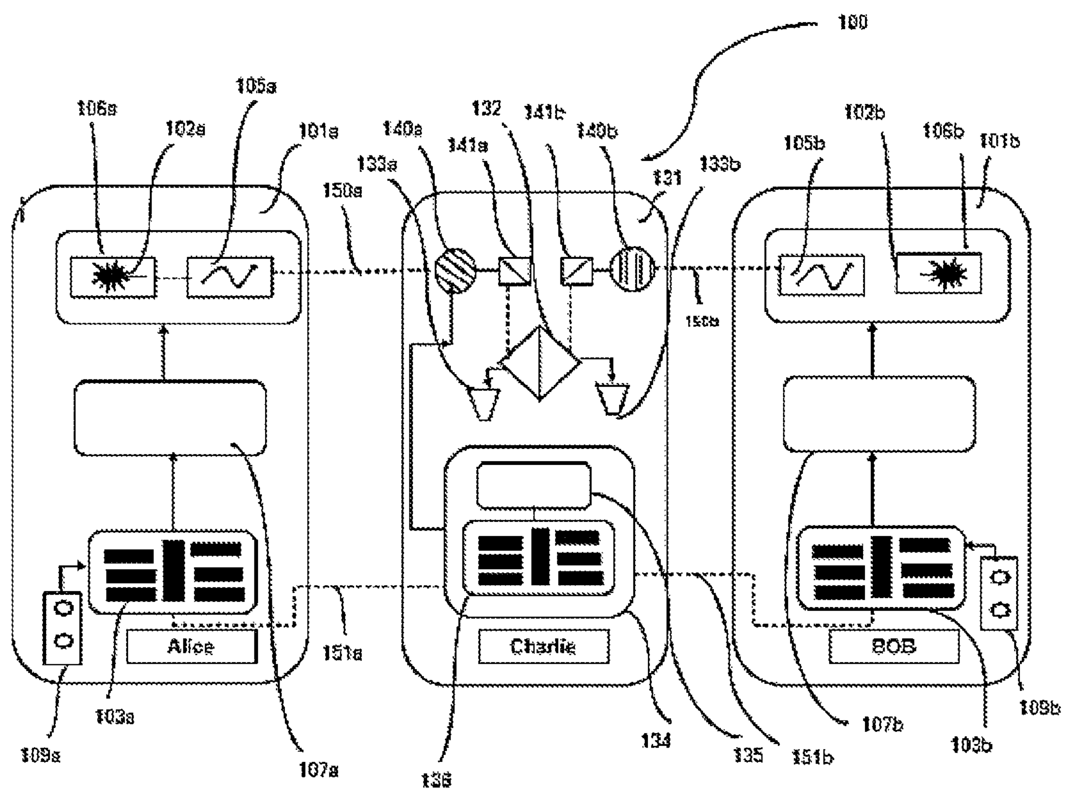

quent qubit signal characteristics based on this spectral feedback, enabling the establishment of a cryptographic key between transmitters using the detected signals. This adjustment optimizes the cryptographic key rate, enhancing security and efficiency in quantum communication protocols.

13 Claims, 3 Drawing Sheets

(51) Int. Cl.
*H04B 10/70* (2013.01)
*H04L 9/12* (2006.01)

(56) References Cited

U.S. PATENT DOCUMENTS

2020/0169397 A1 5/2020 Li et al.
2021/0058154 A1 2/2021 Musumeci et al.
2021/0105135 A1 4/2021 Figueroa et al.
2022/0182152 A1* 6/2022 Wang .................... G06N 3/084
2023/0206105 A1 6/2023 Spiropulu et al.
2024/0346134 A1* 10/2024 Heynssens ............ H04L 9/0852

FOREIGN PATENT DOCUMENTS

CN 207560015 U 6/2018
CN 108494494 A 9/2018
CN 108988953 A 12/2018
CN 109039592 A 12/2018
CN 109586799 A 4/2019
EP 3869758 A1 8/2021
JP 2008541661 A 11/2008
JP 2019216413 A 12/2019
WO 2022095319 A1 5/2022
WO 2022136695 A1 6/2022
WO 2023106923 A1 6/2023

* cited by examiner

METHOD AND SYSTEM FOR ONGOING SPECTRAL FEEDBACK AND CONTROL DURING QUANTUM KEY DISTRIBUTION USING DATA ANALYSIS

A) TECHNICAL FIELD

The present invention is generally related to the field of quantum key distribution. The present invention is particularly related to spectral feedback and control during quantum key distribution. The present invention is more particularly related to method and system for ongoing spectral feedback and control during quantum key distribution using data analysis.

B) BACKGROUND OF THE INVENTION

Quantum key distribution (QKD) is a secure communication technique that employs a cryptographic protocol rooted in quantum mechanics principles. This method facilitates the generation of a shared, random secret key between two parties, ensuring that the key remains exclusively known to them. The secret key can subsequently be utilized for the encryption and decryption of messages, providing robust secure communication.

Many quantum technologies utilize quantum photonic interference, which mandates that input qubit signals be indistinguishable across one or more degrees of freedom, e.g. spectral (frequency), at the interference device. Achieving and maintaining the indistinguishability of two light pulses across these parameters presents a significant technical challenge in generation and manipulation.

Lo, H-K et al. ("Measurement-Device-Independent Quantum Key Distribution" PRL 108, 130503 (2012)) discloses a measurement-device-independent quantum key distribution (QKD) system which removes all detector side channels and doubles the secure distance with conventional lasers.

Berrevoets, R. C., et al. ("Deployed measurement-device independent quantum key distribution and Bell-state measurements coexisting with standard internet data and networking equipment." Commun Phys 5, 186 (2022)) discloses a Measurement-Device Independent Quantum Key Distribution (MDI-QKD) system, containing a Bell-State measurement node, over the same fiber connection as multiple standard Internet Protocol (IP) data networks, between three nearby cities in the Netherlands. Over 10 Gb/s of classical data communication rates simultaneously with the MDI-QKD system was demonstrated, and 200 GB/s of classical data transmission was predicted to be achievable without significantly affecting QKD performance.

Tang, Y-L et al. ("Measurement-Device-Independent Quantum Key Distribution over Untrustful Metropolitan Network" Phys. Rev. X, 6, 011024 (2016)) discloses measurement-device-independent quantum key distribution (MDIQKD) network in a star topology over a 200-square-kilometer metropolitan area, which is secure against untrustful relays and against detection attacks. In the field test, the system continuously ran through one week with a secure key rate 10 times larger than previous results. To implement a HOM dip wavelength calibration, two users send their strong laser pulses without any decoy or qubit modulation and, by scanning the wavelength of the transmitting lasers, the optimized wavelength is obtained.

The above-mentioned shortcomings, disadvantages and problems are addressed herein, and which will be understood by reading and studying the following specification.

C) OBJECTS OF THE INVENTION

The primary object of the present invention is to provide a quantum communication system for the distribution of cryptographic keys, specifically to feedback systems and methods that ensure the maintenance of qubit signal indistinguishability at the receiver during the key distribution process.

Another object of the present invention is to provide a quantum communication system including multiple transmitters and a receiver.

Yet another object of the present invention is to provide a system that uses transmitted information from detected outputs to establish at least part of a cryptographic key between transmitters concurrently.

These and other objects and advantages of the embodiments herein will become readily apparent from the following detailed description taken in conjunction with the accompanying drawings.

D) SUMMARY OF THE INVENTION

The following details present a simplified summary of the embodiments herein to provide a basic understanding of the several aspects of the embodiments herein. This summary is not an extensive overview of the embodiments herein. It is not intended to identify key/critical elements of the embodiments herein or to delineate the scope of the embodiments herein. Its sole purpose is to present the concepts of the embodiments herein in a simplified form as a prelude to the more detailed description that is presented later.

The other objects and advantages of the embodiments herein will become readily apparent from the following description taken in conjunction with the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

The present disclosure pertains to quantum communication systems for the distribution of cryptographic keys, specifically to feedback systems and methods that ensure the maintenance of qubit signal indistinguishability at the receiver during the key distribution process.

Aspects and features disclosed herein are described in detail below. Unless otherwise specified, any disclosed aspects and features may be combined or used independently.

Provided in accordance with aspects of the present disclosure is a quantum communication system including multiple transmitters and a receiver. Each transmitter emits qubit signals within specific time windows, corresponding to various bases and modes. A transmitter controller regulates these signals. The receiver features an interference device with multiple inputs to receive qubit signals and outputs to generate an interference signal. Multiple detectors detect this signal. A receiver controller transmits detected output signal information to transmitters and provides spectral feedback. The system adjusts subsequent qubit signals based on this feedback, involving spectrum characteristics. Moreover, the system uses transmitted information from detected outputs to establish at least part of a cryptographic key between transmitters concurrently.

The feedback enables subsequent qubit signals to be adjusted to maximize cryptographic key rate and qubit signals may be adjusted while the cryptographic key is getting established. Spectral feedback from the receiver is based on spectral information obtained from HOM counts.

A single detected output signal may serve dual purposes: contributing to the establishment of at least part of the cryptographic key and providing spectral feedback information to adjust subsequently transmitted qubit signals. Adjusting this characteristic aims to enhance the indistinguishability of qubit signals fed into the interference device. Improved indistinguishability can potentially increase the rate of cryptographic key, or cipher, generation within the system.

The modes within each basis are orthogonal, meaning that no single mode within a basis can be constructed using a linear combination of other modes within the same basis. Additionally, each mode within one basis can be expressed as a linear combination of multiple modes from the other basis.

In still yet another aspect of the present disclosure, Quantum key distribution (QKD) is a secure communication method employing a cryptographic protocol based on quantum mechanics. It allows two or more parties to generate a shared secret key known only to them, which can be used to encrypt and decrypt messages. The key may consist of an ordered string of bits or characters. To ensure a key is considered secure, it must meet two criteria:

It must be correct, meaning the key bit strings held by Alice and Bob must be identical.

It must be verifiably secret, ensuring the key bit string is known only to Alice and Bob and not to any third party.

A qubit or quantum bit is a basic unit of quantum information. A qubit has two distinct states (e.g., one representing "0" and one representing "1"). Unlike a classical bit, a quantum bit can also exist in superposition states, be subjected to incompatible measurements, and/or be entangled with other quantum bits. In the context of this present disclosure, the term "qubit" encompasses two-state qubits, as well as qudits, denoting a unit of quantum information that can be realized in suitable d-level quantum systems (e.g., a three-level "qutrit").

The system may be configured to make subsequent adjustments to the transmitted qubit signals based on the most recently received feedback and based on previous adjustments and associated feedback.

In still yet another aspect of the present disclosure, an interference device may comprise a single beam splitter. An interference device may comprise multiple beam splitters. An interference device may consist of passive optical components.

The receiver controller can monitor the rate of coincidence counts for photons arriving simultaneously at individual detectors and provide spectral feedback based on this determined coincidence rate. Coincidence counts can include non-Bell states. The coincidence rate may be an absolute rate with respect to time. The coincidence rate may be a relative rate based on the ratio of coincidence counts relative to non-coincidence counts.

The transmitter is configured to adjust the central frequency of the emitted qubit signals based on spectral feedback by an amount, wherein the amount is determined from the deviation of the coincidence rate from a predetermined value.

The expected detection patterns at the receiver depend on the qubit signals sent by the transmitters. If an expected detection pattern is not obtained for a given transmitted pair of qubit signals, this corresponds to an erroneous BSM detection. The calculated erroneous BSM detection percentage may be used for spectral feedback by the transmitters.

Each light source includes a laser, and each transmitter adjusts the spectrum of emitted qubit signals by modifying aspects such as the refractive index or cavity length of the laser. For instance, in diode lasers, changes in optical path length are typically achieved by adjusting the physical cavity length (e.g., through temperature changes) or by varying the refractive index of the gain medium (e.g., altering the inversion on the lasing transition controlled by current).

Each transmitter is configured to adjust the central frequency of the emitted qubit signals by adjusting the temperature of the laser.

The qubit signal may have a full-width half maximum of between 50-500 ps.

In yet another aspect of the present disclosure, the light source may comprise one or more of: a laser, a single molecule, a Rydberg atom, a diamond color center, a defect center within a lattice, and a quantum dot.

The qubit signals may be optical signals. A qubit signal may comprise a single photon. The qubit signals may be generally transmitted from the transmitter to the receiver via a fiber optic cable. The qubit signals may also be transmitted from the transmitter to the receiver wirelessly.

Each qubit signal in the series of qubit signals may have the same or approximately the same intensity (e.g., within ±10% of a mean average). Some embodiments may use a decoy state protocol specifying different intensities for different intensity categories, such as "signal" states, "decoy" states, and "vacuum" states. In these embodiments, each qubit signal within the same intensity category may have the same or approximately the same intensity (e.g., within a predetermined range, such as ±10%, of a mean average). At least one of the transmitter and receiver controllers may comprise a Field-Programmable Gate Array. At least one of the transmitter and receiver controllers may comprise a GPU (graphics processing unit) and/or a CPU (central processing unit). The transmitter controller may comprise a microcontroller. At least one of the transmitter and receiver controllers may comprise one or more integrated circuit (IC) microprocessors. At least one of the transmitter and receiver controllers may comprise memory configured to store computer program code. A controller may comprise one or more processor cores along with memory and programmable input/output peripherals.

The aggregated period for spectral feedback characteristics can be the same or different. It is determined by a minimum number of output signals needed to calculate the relevant statistics. The aggregated period also includes a predetermined time frame.

In another aspect of the present disclosure, when emitted from the transmitter, a signal that is ultimately utilized for establishing the cryptographic key may be identical (e.g., in terms of frequency) to a signal that is ultimately utilized for providing feedback to the transmitter. The utilization of the signal may be determined by various factors, including one or more of: the signal transmitted concurrently within the same time window by other transmitters, the manner in which the signal traverses through the interference device, and the basis selected by each of the transmitters.

The output signals utilized for establishing at least part of the cryptographic key may additionally contribute to the spectral feedback information employed to adjust characteristics of subsequently transmitted qubit signals.

If a characteristic tends to drift more rapidly, the system may be configured to perform statistical analysis on the output signals more frequently to generate feedback for that characteristic. Additionally, the number of output signals required to conduct a meaningful analysis is another important factor. If the analysis requires simply a rate of any type of output signal, measuring over a short period of time may provide statistically meaningful results. However, if only a subset of the total output signals is being used (e.g., coincidence counts), then the system may be configured to monitor these states over a longer period of time to ensure that a meaningful result for spectral feedback can be obtained.

The cryptographic key may be established based on information relating to detected output signals corresponding to suitable entangled basis states. In the case of two transmitters, the suitable entangled basis states may be Bell states. In the case of more than two transmitters, the suitable entangled basis states may be Greenberger-Horne-Zeilinger (GHZ) states.

The cryptographic key may be established based on information relating to detected output signals corresponding to a photon in an early time bin detected at a first detector and a photon in a late time bin detected at a second detector.

Each qubit signal of the transmitted qubit signals may be encoded using early and late time bins within the time window. Each qubit signal of the transmitted qubit signals may be encoded using different frequency bins.

In another aspect of the present disclosure, there is provided a quantum communication system receiver comprising: an interference device having multiple inputs configured to receive multiple series of qubit signals from multiple transmitters and multiple outputs configured to produce signals based on the interference of the received qubit signals at the interference device; multiple detectors configured to detect the output signals at the multiple outputs of the interference device; and a receiver controller configured to transmit information relating to the detected output signals to the transmitters, and to provide feedback based on the outputs, wherein the feedback comprises information on a plurality of the detected output signals and corresponds to spectral similarity characteristic of the qubit signals.

In another aspect of the present disclosure, there is provided a method for establishing at least a portion of a cryptographic key, the method comprising: transmitting a series of qubit signals from multiple transmitters, each qubit signal being within a respective time window and corresponding to a basis within a plurality of bases and a mode within a plurality of modes of the basis; and controlling the series of qubit signals emitted by a light source; receiving the qubit signals at a receiver; interfering multiple qubit signals from the multiple transmitters to produce an interference output signal based on interference at the interference device; detecting the output signal at multiple outputs; and transmitting information relating to the detected output signals to the transmitters, automatically providing spectral feedback based on an analysis of the detected output signals over a period of time, wherein the feedback corresponds to spectral characteristics of the qubit signals, the characteristics comprising spectral similarity of the qubit signals, and concurrently enabling adjustment of subsequently transmitted qubit signals based on the received feedback and establishing at least part of a cryptographic key between the transmitters based on the transmitted information relating to the detected output signals. The method comprises adjusting spectral characteristics of subsequently transmitted qubit signals based on the received feedback.

In yet another aspect of the present disclosure, a single photon detector may comprise one or more of the following: a photomultiplier tube (PMC), a hybrid photodetector (HPM), a single-photon avalanche diode, and a superconducting nanowire single-photon detector (SNSPD).

In still yet another aspect of the present disclosure, the rate of detecting a particular output signal may comprise measuring the time to reach a predetermined number of detected particular output signals, and/or counting the number of detected particular output signals in a predetermined time period. That is, the rate corresponds to the number of detections over a particular time frame.

In another aspect of the present disclosure, qubit signals may incorporate decoy states. Practical QKD systems utilize multi-photon sources, deviating from the ideal BB84 protocol, thereby rendering them vulnerable to photon number splitting (PNS) attacks. Addressing this inherent vulnerability of practical QKD systems involves employing a decoy state technique, wherein multiple intensity levels are used at the transmitter's source. For instance, Alice transmits qubits using varying intensity levels (one signal state and several decoy states), each exhibiting diverse photon number statistics throughout the channel. Post-transmission, the transmitter publicly discloses which intensity level was employed for transmitting each qubit.

In still yet another aspect of the present disclosure, the cryptographic key may be established exclusively using information derived from detected outputs, where one photon is detected in an early time bin at a first detector, and another photon is detected in a late time bin at a different second detector.

In still yet another aspect of the present disclosure, the data analysis is beneficial due to the dependence of specific outputs on quantum states, which inherently yield random outcomes upon measurement (e.g., originating from qubit signal generation or interference at the device). Consequently, identical setups of multiple systems would typically yield differing outputs. However, over time, the data analysis should yield a sufficiently consistent set of results to enable meaningful spectral feedback generation.

It is to be understood that the aspects and embodiments of the disclosure described above may be used in any combination with each other. Several of the aspects and embodiments may be combined to form a further embodiment of the disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

E) BRIEF DESCRIPTION OF THE DRAWINGS

Figure 1B:
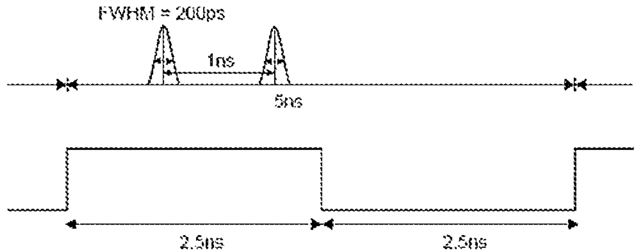

The other objects, features and advantages will occur to those skilled in the art from the following description of the preferred embodiment and the accompanying drawings in which:

FIG. 1*a* is a schematic overview of an embodiment of a quantum communication system;

FIG. 1*b* depicts a laser operation at a clock rate of 200 MHz; and

Figure 2:
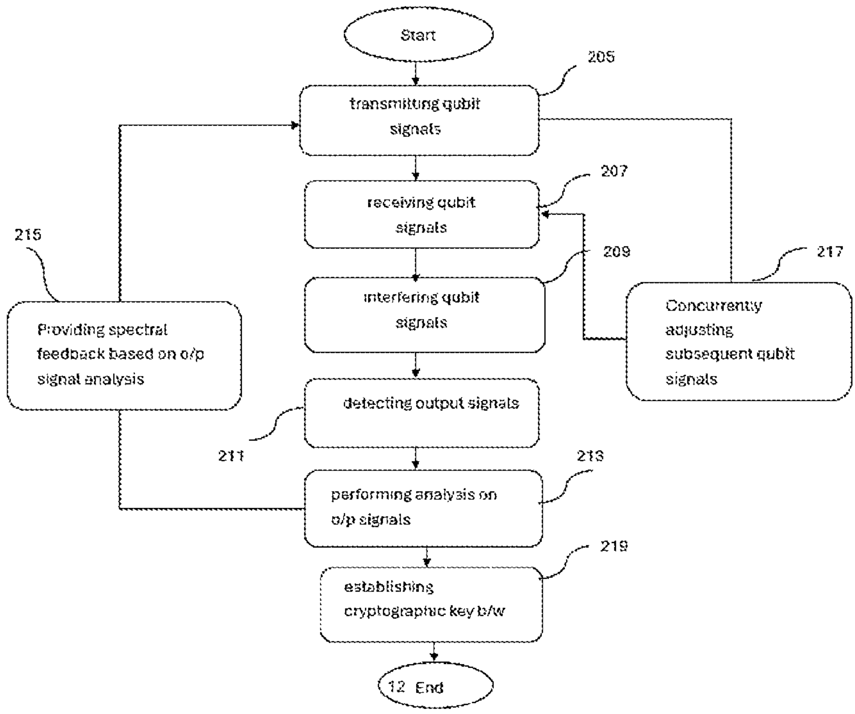

FIG. 2 depicts a method of establishing a cryptographic key.

Although the specific features of the present invention are shown in some drawings and not in others. This is done for convenience only as each feature may be combined with any or all of the other features in accordance with the present invention.

F) DETAILED DESCRIPTION OF THE DRAWINGS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that other changes may be made without departing from the scope of the embodiments. The following detailed description is therefore not to be taken in a limiting sense.

As previously noted, various techniques have been proposed for utilizing quantum mechanics to establish a shared key between multiple users. The application of quantum mechanics enables the two communicating users to ascertain whether a third party is attempting to obtain information about the key (e.g., through eavesdropping).

In the category of quantum communication systems described herein, two users transmit qubits to a central receiver where the qubits can interact with each other via an interference device. It is crucial that the qubits are sufficiently indistinguishable to facilitate the establishment of a key.

Historically, various methods have been employed to ensure that qubits are indistinguishable. These methods include:

Utilizing a calibration mode where strong laser pulses are sent by the transmitters without any decoy or qubit modulation and scanning the wavelength, as detailed in the background section.

Employing strong laser pulses and scanning while monitoring a beat frequency to ensure the lasers maintain spectral consistency.

In both scenarios, the light sources are adjusted using additional modes-such as spatially through an auxiliary fiber or temporally through separate time intervals-distinct from those used for distributing the cryptographic key. This ensures that the spectrum, frequency, timing, and polarization of the light from each source are aligned. Subsequently, the light source is switched to a qubit mode with modulated lower intensity, which is then utilized to transmit qubit signals for the purpose of establishing or distributing the cryptographic key.

Further, quantum key distribution can be enhanced by reducing or eliminating drift in the light sources during the distribution process. Although the light sources may initially emit sufficiently indistinguishable qubit pulses following calibration over spectral profile of the qubit signals may drift. This drift reduces the degree of indistinguishability, leading to a decrease in the key generation rate and potentially resulting in a shorter key being established over a given time period, which can be problematic if a minimum key length is required.

A method has been devised for continuously monitoring the degree of indistinguishability during key distribution and providing feedback to allow real-time adjustments to the qubit signals, ensuring that any drift or perturbation in the transmitters and/or quantum transmission lines can be effectively compensated.

The present technology relates to a system where the receiver automatically provides feedback based on the detected output to allow the transmitted signals to be adjusted to increase indistinguishability. The feedback relates to the spectral similarity of the qubit signals.

The system is configured to: automatically adjust the transmitted qubit signals based on the received feedback in real time; and establish a cryptographic key between the transmitters based on the outputs signals.

Various aspects of the invention are described with reference to the figures. For illustrative purposes, the components depicted in the figures are not necessarily drawn to scale; rather, emphasis is placed on highlighting the contributions of the components to the functionality of the invention. Throughout the description, several alternative features are introduced. It should be understood that, according to the knowledge and judgment of a person of ordinary skill in the art, these alternative features may be substituted in various combinations to achieve different embodiments of the invention.

Referring to FIG. 1*a*, FIG. 1*a* illustrates the structure of quantum communication system.

FIG. 1*a* shows a quantum communication system 100 comprising at least two transmitters 101*a, b* and a receiver 131. As is customary in the field, the transmitters (or users) are named Alice (101*a*) and Bob (101*b*) and it is these devices that are trying to establish, transmit or distribute a common cryptographic key. The receiver is named Charlie (131).

In quantum key distribution, Eve typically represents a third-party entity attempting to intercept the generated key without detection by the transmitters (and possibly the receiver). Transmitters (101*a*, 101*b*) are generally assumed to be trustworthy, while the trustworthiness of the receiver, Charlie (131), remains uncertain. In the context of MDI-QKD (Measurement-Device-Independent QKD), Eve possesses full knowledge of the central node's operation, measurement outcomes, and hardware access. Consequently, MDI-QKD does not differentiate between Charlie and Eve at the central node, treating the central node itself as untrustworthy due to Eve's potential capabilities and access.

Each transmitter (101*a*, 101*b*) includes: a light source (106*a*, 106*b*) designed to emit a series of qubit signals, where each qubit signal consists of one or more quantum pulses arranged in time bins and within a specified time window; and a transmitter controllers (103*a*, 103*b*) configured to manage the emission of the series of qubit signals from the light source.

The qubit signals are transmitted through a quantum channel using fiber optic cables (150*a*, 150*b*). These cables can vary in length, for instance, up to 200 km, and may be laid out in diverse configurations. Alternatively, in some scenarios, qubit signals can be transmitted through free space, such as when Charlie (131) is positioned on a satellite or communicating wirelessly with the transmitters.

The receiver includes an interference device (132) with multiple inputs designed to receive the series of qubit signals, and it features multiple outputs that generate an output signal based on the interference occurring within the device. Additionally, there are multiple detectors (133*a*, 133*b*) within the receiver (131) configured to detect the output signal at the various outputs of the interference device.

The receiver also includes a receiver controller (134) designed to analyze the output signals detected by the detectors (133*a*, 133*b*) and to autonomously provide feedback based on these detected signals. The feedback pertains to spectral similarity characteristic of the qubit signals. Information regarding the output signals can be conveyed back to the transmitters (101*a*, 101*b*) through a classical communication channel, which may utilize fiber optic cables (151*a*, 151*b*) in certain embodiments. Alternatively, in other configurations, communication may occur through free-space channels. In some embodiments, parts of the feedback information may also be transmitted through a classical network, such as the Internet, which may or may not involve the use of fiber optic or free-space channels.

Quantum Key Distribution Protocol

An MDI-QKD protocol is illustrated as below in Table 1 and proceeds as follows:

Alice and Bob agree on what each state represents in the computational basis (e.g., let $|e\rangle$, $|+\rangle$ =0 and $|l\rangle$, $|-\rangle$ =1). Both Alice and Bob prepare phase-randomized WCPs (Weak Coherent Pulse) in the four possible states—here time-bin encoding is used—and send them over public channels to an untrusted relay, Charlie (or Eve).

TABLE 1

Illustration of the MDI-QKD protocol

| | | | | | | |
|---|---|---|---|---|---|---|
| Alice basis | Z | X | Z | X | X | Z |
| Alice bit | 1 | 0 | 0 | 1 | 1 | 1 |
| Alice state | $\lvert l\rangle$ | $\lvert +\rangle$ | $\lvert e\rangle$ | $\lvert -\rangle$ | $\lvert -\rangle$ | $\lvert l\rangle$ |
| Bob basis | X | X | Z | Z | X | Z |
| Bob bit | 1 | 1 | 1 | 0 | 1 | 0 |
| Bob state | $\lvert -\rangle$ | $\lvert -\rangle$ | $\lvert l\rangle$ | $\lvert e\rangle$ | $\lvert -\rangle$ | $\lvert e\rangle$ |
| Charlie/Eve BSM | $\lvert\Psi^-\rangle$ | $\lvert\Psi^-\rangle$ | None | None | $\lvert\Psi^+\rangle$ | $\lvert\Psi^+\rangle$ |
| Same basis? | No | Yes | Yes | No | Yes | Yes |
| Alice sifted key | | 0 | | | 1 | 1 |
| Bob sifted key | | 1 | | | 1 | 0 |
| Sifted key | | 0 | | | 1 | 1 |
| QBER ≤ 11%? | | | Yes | | | |

The untrusted relay, Charlie, performs a Bell-state measurement (BSM) that projects the incoming signals onto a Bell state. Such a projective measurement can be accomplished using only linear optical elements. In this case, projections are restricted to $|\Psi\pm\rangle$. Projection onto one or more Bell states allows a successful security proof.

Alice and Bob apply decoy-state techniques to estimate the yield and quantum bit error rate (QBER) for various input photon numbers.

Charlie announces over a public channel, which events result in a successful BSM, along with the results of the measurement (in cases where more than one Bell-state is used in the protocol).

Alice and Bob keep the data corresponding to their qubits that resulted in a successful BSM and discard the rest. They also communicate their basis choices via a public channel to post-select the events in which they used the same qubit-preparation basis.

Alice and Bob account for how the system responds to establish a common cryptographic key. In this embodiment, except for the events in which both Alice and Bob prepare qubits in the X-basis and Charlie successfully measures the $|\Psi\rangle$ Bell-state, the remaining key bits belonging to Alice and Bob are anti-correlated and require either Alice or Bob to apply a bit-flip to their data.

Typically, the final step in the process is that the common quantum key is then classically post-processed to remove any errors in the keys possessed by Alice and Bob, and to remove any information that Eve may have obtained about the mutual key shared by Alice and Bob.

Regarding the Bell states, the protocol utilizes quantum interference of photons from separate sources and a projective Bell-state measurement (BSM), resulting in an entangled-state measurement only when the photons are annihilated upon detection. The Bell basis includes the maximally entangled states:

$$|\Phi^{\pm}\rangle = \frac{1}{\sqrt{2}}\left(|e_1e_2\rangle \pm |l_1l_2\rangle\right)$$

$$|\Psi^{\pm}\rangle = \frac{1}{\sqrt{2}}\left(|e_1l_2\rangle \pm |l_1e_2\rangle\right)$$

After passing through the beam splitter, the measured outputs at outputs 3 and 4 correspond to the following:

$$|\Psi^+\rangle \overset{BS}{\to} \frac{i}{\sqrt{2}}\left(|e_3l_3\rangle + |e_4l_4\rangle\right)$$

$$|\Psi^-\rangle \overset{BS}{\to} \frac{1}{\sqrt{2}}\left(|e_3l_4\rangle - |l_3e_4\rangle\right)$$

$$|\Phi^+\rangle \overset{BS}{\to} \frac{i}{2}\left(|e_3e_3\rangle + |e_4e_4\rangle + |l_3l_3\rangle + |l_4l_4\rangle\right)$$

$$|\Phi^-\rangle \overset{BS}{\to} \frac{i}{2}\left(|e_3e_3\rangle + |e_4e_4\rangle - |l_3l_3\rangle - |l_4l_4\rangle\right)$$

Not all of the possible input states from Alice and Bob undergo quantum interference at the receiver's beam splitter, such as input Z-basis states $|e\rangle$ and $|l\rangle$. Given that the wavefunctions of these two states have no spectral overlap, they do not interfere in a beam splitter and can, therefore, be considered orthogonal states in Hilbert space. Whether the input states from Alice and Bob are orthogonal or not in the degree of freedom of interest, they must still be indistinguishable in other degrees of freedom, including spectral similarity, for a Bell-state projection to be possible.

This constraint is due to the requirement for no possible 'which-path' information that could correspond to correlations between photon detections and their sources.

The Bell-state measurement is the foundation of the "measurement-device-independent" property of MDI-QKD, since measurement results are not one-to-one with prepared qubits. Rather, prepared qubits are two-to-one with measurement results, as Alice and Bob each prepare a qubit for every Bell-state measurement result. The consequence is that each measurement result does not announce information about a specific monopartite quantum state of a photon, which could reveal information about the key to a third party, such as Eve, but rather it announces a correlation relation between the two qubits prepared by Alice and Bob corresponding to the specific Bell-state measurement event. Finally, this means that even if Eve has full information about the measurement results, at best she knows only about the correlation between the qubits sent by Alice and Bob, and knows nothing about the final bit string that becomes their secure key.

After sifting the raw key, Bob applies a bit-flip to his sifted key except where both Alice and Bob prepared a qubit in the X-basis and the BSM resulted in a $|\rangle\rangle$ projection. After using decoy-state techniques to estimate QBER, if the value is ≤11% the secure key is kept and error correction and privacy amplification are applied, otherwise the key is discarded, and the protocol is repeated.

Although a complete network may support a star-type topology, a first embodiment, as illustrated in FIG. 1*a*, includes just two end users, Alice and Bob, and a central node, Charlie.

FIG. 1*b* illustrates weak coherent pulses (WCP) with time-bins. the end user transmitters emit modulated and attenuated Weak Coherent Pulses (WCPs) as the qubit signals with a vacuum wavelength of ~1550 nm and repetition (clock) rate of 200 MHz to generate photonic time-bin qubits with time-bin width and separation of 200 ps and 1 ns, respectively. Qubit generation is accomplished according to a decoy-state protocol and is controlled using random bits from quantum random number generators (QRNGs) by field-programmable gate array (FPGA) units. The decoy-state protocol and the optical isolators at the end users are useful to prevent side-channel attacks on the photon sources operated by the end users.

System parameters, such as channel loss and propagation delay, are estimated before key-exchange commences, so that WCP attenuation can be adjusted to optimize the various levels of the decoy-state protocol and each end user can correlate their received BSM (Bell State Measurement) signals with their transmitted qubits. After key exchange, classical post-processing (error correction and privacy amplification) of the data is done via automated processes performed by the FPGAs at the end-users (transmitters). The quantum and classical signals will be compatible with classical telecommunications signals sent over the same fibers by means of dense wavelength division multiplexing (DWDM) and careful spectral and timing selection to mitigate the noise effects of Raman scattering.

Qubits are sent from Alice and Bob to Charlie for Bell-state measurement. Photon detection is achieved at Charlie using single photon detectors. Time-reversed entanglement is created by passing indistinguishable WCPs from Alice and Bob through a beam splitter interference device and detecting them via single photon detectors, where bipartite detection (e.g., detection of photons at two separate detectors) enables a BSM projection onto the $|\Psi-\rangle$ state. In this embodiment, only the $|\Psi-\rangle$ state is used for key distribution. Other embodiments may use other multipartite entangled states (e.g., GHZ states or multiple Bell states) for key distribution.

The central node at Charlie includes a synchronizing clock signal, as well as feedback-based control systems to ensure that the end users produce qubits that are indistinguishable in the spectral degrees of freedom as they arrive at and are overlapped on Charlie's beam-splitter.

It will be appreciated that, in quantum mechanics, the indistinguishability of two photons is a continuous variable. That is, it is theoretically possible to have completely distinguishable or indistinguishable photons, but in practical terms, it is possible to have completely distinguishable photons, completely indistinguishable photons, and partially indistinguishable photons. In the context of a HOM dip, completely distinguishable photons will interact with the beam splitter (or interference device) independently (i.e., no interaction with each other), and completely indistinguishable photons will interact with the beam splitter and each other to interfere completely destructively at one output port and completely constructively at the other port. Partially indistinguishable photons will have an intermediate interaction with each other as they pass through the beam splitter such that some will destructively interfere, and others will act independently. Indistinguishable photons are those which are sufficiently indistinguishable such that they interact with each other at the interference device to a sufficient degree to permit a cryptographic key to be established. That is, indistinguishable photons may include partially indistinguishable photons.

However, there is challenge in producing indistinguishable photons is the uncertainty in the spectral degrees of freedom of time-bin pulses. Given that time and frequency are Fourier conjugate variables and that the time-bin pulses used are Fourier limited; to model the amount of distinguishability in the spectral degrees of freedom, the corresponding line shapes can be taken to be Gaussian. The temporal and spectral Gaussian line shapes have inversely proportional full-width half-max (FWHM) values.

Alice and Bob Transmitters

Alice and Bob transmitter devices 101*a* and 101*b* have an identical structure. The hardware architecture located at Alice and Bob (101*a* and 101*b*) contains all components and control systems necessary to generate qubits and send them to Charlie (131) through a quantum channel, as described previously. As the experimental setup belonging to Alice and that belonging to Bob are identical, only one will be described in the following.

Alice and Bob (101*a* and 101*b*) may have the same hardware architecture, but one transmitter (e.g., Alice) may have additional code to allow her to receive feedback from Charlie (131) to adjust the output of her laser to match its wavelength with that of Bob's laser.

The light source 106*a*, 106*b* in this embodiment comprises: a laser (102*a*, 102*b*) which is a semiconductor-type laser, and various optical components 105*a*, 105*b* used to modulate and convert the raw laser pulse into a qubit signal. The laser operates at a single wavelength (e.g., of ~1550 nm). Operating at a single wavelength is important for pulses from Alice and Bob to be spectrally indistinguishable.

Changing the temperature of the cavity, using a temperature controller, causes expansion or contraction of laser cavity length, and a subsequent change in the index of refraction. Consequently, the optical path length of the cavity changes, allowing for spectral tuning of the central wavelength as needed to match the wavelengths emitted by Alice and Bob (101*a* and 101*b*). The light source is controlled by a transmitter controller, which in this case uses an FPGA (103*a*, 103*b*). The transmitter controller (103*a*, 103*b*) controls the laser driver (which provides a stable current supply for the laser diode), and the temperature controller.

Generally, the laser should have a linewidth of below a predetermined threshold value (e.g., 2 MHz). The predetermined threshold linewidth value may be configured to meet a certain threshold percentage of erroneous BSM detections. These thresholds may be determined according to the need for generating a key (e.g., key length, rate of key generation etc.). The laser may have a power of less than 40 mW. The laser may be tunable such that the central wavelength can be controlled within less than a nanometer.

Regarding the transmitter controller 103*a*, 103*b*, the FPGA 103*a*, 103*b* is an integrated circuit with an array of programmable logic blocks that perform logical computations at the hardware level, rather than using software for computation. An advantage of using arrays of logic blocks is that they are much faster than soft microprocessors in some applications, due to their parallel nature and optimality in the use of logic gates. Commercial FPGA architectures often integrate micro-processing systems and related peripherals that can be used as a complete "system on a programmable chip".

The FPGAs in the design act as the hardware-control and data-processing units for the system, with an FPGA unit located at each transmitter (and the receiver). The FPGAs at the locations of Alice and Bob have an identical function in terms of qubit state preparation. At Alice and Bob (101*a*, 101*b*), the FPGA takes random bits of data as input from an external QRNG 109*a*, 109*b* (Quantum Random Number Generator) and then translates that data into a particular state to be prepared for each qubit. The FPGA then sends output signals to each hardware component in the state-preparation setup, resulting in qubits being prepared and sent to Charlie (131). In this embodiment, these transmitted qubits are initially used to estimate the channel loss and propagation delay of the system, after which they are used to perform the MDI-QKD protocol. In other embodiments, higher power classical intensities could also be used to perform calibration. The specific input and output signals from Alice's FPGA will be discussed along with the different peripherals that send (receive) signals to (from) the FPGA.

FPGAs of Alice and Bob have similar or identical functions with the exception of 1. taking different feedback signals and using them to control indistinguishability characteristics, e.g., laser wavelength. 2. In the post-processing step, either Alice or Bob (101$a$, 101$b$) may send asymmetric information to the other to inform an action to ensure that their secure keys are identical and private.

The respective propagation times between Alice and Charlie, 150$a$ and Bob and Charlie, 150$b$ may vary with time (e.g., due to thermal fluctuations in the optical fiber links 150$a$, 150$b$).

As Charlie distributes the master clock to both Alice and Bob, the FPGA in this embodiment adjusts the phase of the master clock signal sent to Bob to match the arrival time of Alice's and Bob's qubits at Charlie. Based on previous experiments using deployed fibers, the timing drift may range from 10 to 50 ps per minute, depending on the fiber link. This drift is sufficiently small to enable the acquisition of pulse-timing data with adequate statistical significance to compensate for the drift.

As a result of slow thermal drifts in the lasers 102$a$, 102$b$ used by Alice and Bob (101$a$, $b$) for qubit signal preparation, the wavelengths of the lasers vary slowly with respect to one another. The FPGA at Charlie (131) uses coincidence count (HOM) information from the BSM/HOM logic board to provide feedback to Alice (102$a$) for spectral tuning, so the wavelength of her laser matches that of Bob.

Here, wavelength drift is similarly assumed to take place slowly, such that the low rate of information provided in the HOM signal will have sufficient statistical validity to provide adequate feedback for spectral matching and stabilization.

After Charlie's (131) hardware performs its function, it sends BSM (Bell State Measurement) results as well as a master clock signal to both Alice and Bob (101$a$, $b$) and a HOM feedback signal to Alice, to tune qubit preparation for indistinguishability. This signal is received by the transmitter controllers, and used to condition the qubit values stored in memory while the feedback signals are processed. Alice uses her received HOM signal to tune the central wavelength of her laser to match that of Bob's laser via a thermoelectric cooler temperature controller.

For the controllers 103$a,b$ of the transmitters and of the receiver to accomplish the tasks described above, they require certain capabilities: sufficient clock rate to process data and output the necessarily fast electrical signals to peripheral devices, sufficient memory to store the data used to generate the secure key, sufficient input/output (I/O) ports to interface with all necessary peripherals, a sufficient number of processors to multi-task, and a sufficient number of programmable logic (PL) cells to perform simultaneous logic operations. Generally, the transmitter and/or receiver controllers should have a clock rate of at least 400 MHz.

Further, the light source is controlled by the transmitter controller via an electrical conditioning components 107$a,b$. As noted above the light source comprises: a laser 106$a$ and optical conditioning components 105$a,b$ for converting the raw light signal into a qubit signal.

The optical conditioning components in this case may comprise one or more of: an intensity modulator, a phase modulator, a pulse modulator, an attenuator, a beam splitter, and an isolator. The electrical conditioning components may comprise one or more of: a digital to analog converter (fast and or slow); an analog to digital converter; a RF amplifier and a DC amplifier.

The general purpose of an intensity modulator is to create the optical pulses encoding the time-bin states based on the electrical signals from the transmitter controller 103$a$, 103$b$. The electro-optic intensity modulator takes an optical signal from the laser with a time-varying electrical signal as inputs, and it produces a time-varying optical signal as output. Specifically, in the task of qubit preparation in this embodiment, the purpose of the first intensity modulator is to take a 2.5 ns pulse from the laser as input, and to suppress that pulse entirely (or at least sufficiently, e.g., by a factor of 100, or to at least 30 dB).

In this embodiment, the working principle of the intensity modulator is that of a phase-modulated Mach-Zehnder interferometer (MZI), in which an electro-optic intensity modulator takes an incoming optical signal and splits it into two arms via a beam splitter. It also takes an electrical input signal to produce an electric potential difference in one arm across the wave-guide medium ($LiNbO3$ in this case) changing its polarization-dependent index of refraction, an effect referred to as the Pockels effect. The result is a relative change in the optical path-length between the two arms, producing a phase shift in the signal traversing the first arm relative to the signal in the second arm. The optical signals from the two arms are recombined using another beam splitter, at which they interfere. The result is that, by applying the appropriate voltage to the IM, there is constructive interference at the output port when an optical signal is desired, and complete destructive interference, corresponding to a relative $\pi$-shift in the phase-modulated arm, or $\Delta\varphi = m\pi$ for odd m, when an optical signal is not desired. In other embodiments, other types of intensity modulators may be used.

For the present design, the intensity modulator must meet specific criteria: it needs sufficient bandwidth to swiftly modulate and generate distinct time-bin signals. Additionally, the extinction ratio (ER), which denotes the ratio of complete constructive to complete destructive interference, must be sufficiently high. This ensures excellent contrast and a high signal-to-noise ratio (SNR). Maintaining a high ER is crucial because any failure to fully suppress laser pulses outside of the desired time-bins can lead to erroneous detections at Charlie, thereby increasing the Quantum Bit Error Rate (QBER)

Generally, the intensity modulator should have a bandwidth of at least 10 GHz and span the frequency range of the light source. The extinction ratio of the intensity modulators should be greater than 30 dB for DC signals and greater than 20 dB for radio frequency (RF) signals.

Separate intensity modulators may serve different functions. For instance, a first intensity modulator could create time-bin states by modulating the intensity of input laser pulses over time. Meanwhile, a second intensity modulator might adjust the overall intensity within a clock cycle to implement varying intensities required by the decoy-state protocol. The vacuum state could be generated by completely suppressing the optical signal using both intensity modulators in series. Additionally, the relative intensities of the signal and decoy states could be controlled using the second intensity modulator.

For the present design, the intensity modulator must meet specific criteria: it needs sufficient bandwidth to swiftly modulate and generate distinct time-bin signals. Additionally, the extinction ratio (ER), which denotes the ratio of complete constructive to complete destructive interference, must be sufficiently high. This ensures excellent contrast and a high signal-to-noise ratio (SNR). Maintaining a high ER is crucial because any failure to fully suppress laser pulses outside of the desired time-bins can lead to erroneous detections at Charlie, thereby increasing the Quantum Bit Error Rate (QBER)

Generally, the intensity modulator should have a bandwidth of at least 10 GHz and span the frequency range of the light source. The extinction ratio of the intensity modulators should be greater than 30 dB for DC signals and greater than 20 dB for radio frequency (RF) signals. Separate intensity modulators may serve different functions. For instance, a first intensity modulator could create time-bin states by modulating the intensity of input laser pulses over time. Meanwhile, a second intensity modulator might adjust the overall intensity within a clock cycle to implement varying intensities required by the decoy-state protocol. The vacuum state could be generated by completely suppressing the optical signal using both intensity modulators in series. Additionally, the relative intensities of the signal and decoy states could be controlled using the second intensity modulator.

The phase modulator (PM) is designed to take an optical signal and an electrical input signal to induce a shift in optical path length, thereby producing a phase-shifted optical output signal. Similar to the electro-optic intensity modulator (IM), the electro-optic PM utilizes the Pockels effect to achieve this phase shift. In the experimental setup, the specific role of the phase modulator is to introduce a π-phase shift in the late time-bin when preparing the state $|-\rangle=(1/\sqrt{2})\ (|e\rangle + e^{i\pi}|l\rangle)=(1/\sqrt{2})\ (|e\rangle - |l\rangle)$. The waveguide medium employed in this instance is LiNbO3.

The performance requirements of the phase modulator are similar to those of the intensity modulator, with some exceptions. Specifically, the required bandwidth of the phase modulator is less than half that of the intensity modulator, as it only needs to modulate the optical phase of the late time-bin and not the early one. Unlike the intensity modulator, there is no requirement for extinction ratio (ER) in the phase modulator since it does not involve optical interference. Additionally, there is no DC-bias voltage applied to the phase modulator. Control of the phase modulator is managed by the transmitter controller 103a, 103b through electrical conditioning components. Generally, the phase modulator should have a bandwidth of at least 5 GHz.

Additionally, it is crucial that there be no information allowing Eve to distinguish between the prepared states. Therefore, the mean optical power of laser pulses used to prepare both Z-basis and X-basis states must be identical. The X-basis states, which consist of two pulses, achieve this by ensuring that each time-bin in X-basis states has half the intensity of the time-bins prepared in Z-basis states.

To ensure random state generation as required by the MDI-QKD protocol, a source of true random numbers is essential. A Quantum Random Number Generator (QRNG) 109a, 109b relies on non-deterministic quantum measurement results to produce random bits of data. QRNGs typically provide specifications such as an entropy data rate and a post-processed data rate. The entropy data rate represents raw data resulting from measurements using imperfect hardware and non-uniform probability distributions. To remove biases from this data, various post-processing methods are employed, often resulting in the discarding of some bits to achieve unbiased, uniformly distributed random data. Consequently, the post-processed data rate is generally lower than the entropy data rate, often by nearly an order of magnitude in commercial devices.

In this embodiment, Alice and Bob each require 1 Gbps of post-processed random data for random state preparation and decoy level selection. The QRNGs used in the architecture also include interface modules to communicate with FPGAs via Ethernet or other I/O ports.

After generating qubits using relatively high-intensity optical signals controlled by the transmitter controller, laser, and intensity and phase modulators, it is necessary to attenuate the signal intensity to ensure the mean photon number of the qubits, μ, is <1. This attenuation is achieved using a combination of manual and electronic variable optical attenuators (VOAs).

In this embodiment, variable optical attenuators function by transmitting a diverging optical signal, in free space, into a collimating lens. The proportion of the collimated beam that is displaced away from the coupler into the outgoing fiber determines the level of attenuation.

The VOAs should be designed to operate effectively at 1550 nm wavelength and offer variable attenuation capabilities up to ≥70 dB. The setup includes VOAs with a combined attenuation range of 3-75 dB.

To mitigate source-targeting adversarial attacks, such as laser-seeding and Trojan Horse attacks, an optical isolator (ISO) is employed to enable one-way propagation of optical signals from Alice/Bob (101a, b) to Charlie (131). In this embodiment, the optical isolators, also known as Faraday isolators, utilize magneto-optic principles involving birefringence and polarization rotation. They transmit light in the forward direction while absorbing or deflecting light traveling in the reverse direction.

The isolator in the experimental design should ensure low-loss propagation of outgoing 1550 nm light while providing at least 50 dB of isolation for incoming light.

In this embodiment, the transmitter receives feedback from Charlie via a fiber optic channel 151a. The received optical signal is converted to an electrical signal via a dense wavelength-division multiplexing (DWDM) small form-factor pluggable (SFP) transceiver. In the transmitter, the transceiver takes as input a multiplexed optical signal, i.e., a superposition of different wavelengths, and demultiplex it into its component wavelengths. It then converts the optical signals to electrical output signals which can be read by the transmitter FPGA 103a,b.

The requirements of the DWDM SFP are that it should have at least 3 channels to be capable of multiplexing/demultiplexing 3 separate signals, it should transmit/receive optical signal over at least 50 km of fiber, it should operate at a central wavelength of 1550 nm, and it should have a high enough bandwidth to process and send clock, measurement results, and feedback data from Charlie (131).

Charlie (131) Receiver

The hardware setup at Charlie (131) includes electronic and photonic components essential for performing Bell State Measurements (BSMs), counting single and coincidence events, implementing synchronization and polarization control systems, and delivering measurement results, clock signals, and necessary feedback to Alice and Bob (101a, b).

The receiver controller 134, in this case comprising FPGA 136, resembles those found in Alice's and Bob's setups. At Charlie, the FPGA is synchronized with the master clock and receives input signals from logic board 135. This board provides Bell State Measurement (BSM) and Hong-Ou-Mandel (HOM) information based on signals from the single photon detectors 133a, b. Additionally, the logic board 135 routes raw output signals from the single photon detectors directly to the FPGA without modification. The interference device includes a polarization-maintaining beam splitter (PMBS) 132 designed to combine photonic signals from its two input ports, allowing them to interfere without altering their polarization states. The PMBS divides the combined optical signal evenly, maintaining a 50:50 ratio between its two output ports.

The complementarity principle states that quantum interference necessitates the absence of 'which-path' information when photons emerge from an interference event, such as within a beam splitter. This implies that even the potential availability of such path information, regardless of whether it is actually measured, can degrade interference.

The two single photon detectors in the experimental design primarily serve to perform Bell State Measurement (BSM) projections. Additionally, they enable coincidence count measurements for spectral indistinguishability feedback. These detectors achieve BSM, and coincidence counts through bipartite detection of qubits from Alice and Bob (101*a, b*), detecting signals that arrive at both detectors simultaneously.

Single photon detector technology utilizes a superconducting circuit that detects photon absorption by registering a temporary increase in the circuit's temperature and subsequent electrical resistance. These detectors are sensitive to both visible and infrared wavelengths and offer advantages over other types of single-photon detectors, including enhanced timing resolution and recovery rates.

Projection into a Bell state can be performed by the single photon detectors regardless of the time-bin states that Alice and Bob (101*a, b*) prepare. Coincidence counts may occur when Alice and Bob (101*a, b*) prepare states that include identical time bins but are distinguishable in some other way.

The described functionality primarily necessitates three specifications for the single photon detectors: high detection efficiency, sufficiently short dead time to register each qubit arrival, and excellent timing resolution (timing jitter) to distinguish between $|e\rangle$ and $|k\rangle$ states with a high signal-to-noise ratio (SNR). A detection efficiency ideally close to 1 is preferred, though 0.9 is sufficient, especially considering the current state-of-the-art is approximately 0.95.

Considering a qubit preparation rate of 200 MHz, a reasonable assumption is that the dead time of single photon detectors should be less than 5 ns to ensure detection of all arriving qubits. This requirement can be slightly relaxed when only $|\Psi-\rangle$ projections are used for establishing the cryptographic key, as only 25% of Bell state measurements (BSMs) project onto the $|\Psi\rangle$ state. Therefore, the average time between $|\Psi-\rangle$ projections is expected to be around 20 ns, not accounting for other factors. In practical terms, the system parameters include qubit preparation at 200 MHz, a mean photon number per laser pulse of approximately 0.3 (including vacuum, decoy, and signal states), channel loss of 0.2 dB/km, insertion loss at Charlie around 5 dB, and detector efficiency of about 90%. Consequently, a single photon detector dead time of approximately 600 ns may be sufficient to register, on average, all $|\Psi-\rangle$ projections.

The BSM component of the BSM/HOM board 135 converts electrical signals from single photon detectors, corresponding to detection patterns projecting onto the $|\Psi-\rangle$ Bell state, into a Boolean electrical output. Other Bell states are not utilized in this embodiment due to the experimental setup's use of linear optics (a beam splitter), absence of heralding or auxiliary photons, and non-photon-number-resolving single photon detectors with a dead time exceeding the temporal separation between early and late time-bins (1 ns). Through time-bin encoding, different detection patterns are mapped onto the Bell basis described earlier. For a given qubit preparation event, when an $|e\rangle$ qubit is detected in one single photon detector and an $|l\rangle$ is detected in the other, the BSM board outputs an electrical signal of "True" to the central FPGA at Charlie, indicating a successful $|\Psi-\rangle$ measurement is recorded.

Due to the use of linear optics without auxiliary photons in this embodiment, it is not feasible to unambiguously project onto the $|\Phi+\rangle$ and $|\Phi-\rangle$ states based on detection patterns. Therefore, the projection onto a single Bell state can only occur 50% of the time. If the detector's dead time were less than the separation between early and late time bins, it would also be possible to detect $|\Psi\rangle$ Bell states. These could potentially replace or supplement the $|\Psi-\rangle$ measurements.

The HOM component of the board detects the photon-bunching effect that occurs when indistinguishable photons arrive at the beam splitter of the interference device and are subsequently detected by photon detectors. When Alice and Bob (101*a, b*) prepare and send identical states to Charlie (131), the photons bunch together, resulting in an electrical signal detected by only one single photon detector. Conversely, when the photons are distinguishable, no bunching occurs.

Photons are detected randomly on separate detectors or the same detector. Consequently, the rate of coincidence counts using photons in the same time-bin decreases when photons are indistinguishable. This information can provide feedback to any system component capable of modifying distinguishability in a photonic degree of freedom. Therefore, HOM interference is utilized to ensure time-dependent matching of laser wavelengths.

The board outputs a Boolean "True" when signals are detected by each single photon detector, and a coincidence electrical signal is generated by the single photon detectors to the BSM/HOM board. The Boolean electrical signal is transmitted to the FPGA, where these signals are aggregated over a specified time interval, and the aggregate value is sent to Alice (101*a*) to minimize spectral alignment of her laser with Bob's (102*b*). In other implementations, a scaled (e.g., normalized) value of the aggregate may be used. Due to the Poissonian photon-number distribution of the Weak Coherent Pulses (WCPs) used for qubit preparation, particularly their multiphoton components, the maximum achievable HOM visibility is limited to the classical limit of 50%.

The receiver communicates with the transmitters in this embodiment via fiber optic cables 151*a, b*. To send a signal to the transmitter, the receiver comprises dense wavelength-division multiplexing (DWDM) small form-factor pluggable (SFP) transceivers. Each transceiver takes several electrical input signals and converts them to optical signals before multiplexing the various generated wavelengths corresponding to the electrical inputs. It then sends the multiplexed optical signal as output.

In the present embodiment, spectral feedback is based on a HOM dip measurement. HOM (Hong-Ou-Mandel) effect relates to the situation where two photons simultaneously enter a 1:1 beam splitter, with one entering at each input. Two completely indistinguishable photons will always exit the beam splitter together in the same output mode, meaning that there is zero chance that they will exit separately with one photon in each of the two outputs giving a coincidence count.

The detection of two photons at different detectors in the same time bin, i.e., $|e3e4\rangle$ or $|l3l4\rangle$, is considered a coincidence count (or HOM detection). This combination is not a Bell state measurement, as such a combination is not possible using identical qubit signals and indicates that the photons emitted by the transmitters are not completely indistinguishable. Therefore, the controller will provide feedback to one or more transmitters to adjust the spectrum of the qubit signals in order to minimize the number of coincidences counts and increase the indistinguishability of the subsequently transmitted photons.

In this embodiment, the feedback is provided to only one of the transmitters 101_a_, 101_b_ (e.g., Alice). The feedback mechanism utilizes either a gradient-descent algorithm, a Proportional-Integral-Derivative (PID) algorithm, or a combination of to optimize the spectral characteristics of Alice's (101_a_) qubit signals. if the rate of coincidence counts is high, the receiver controller may send a feedback signal to one of the transmitters to make an adjustment to the spectrum of the qubit signals. This adjustment may be implemented by changing the cavity length of the laser.

After the change has been implemented, the receiver controller may measure the rate of coincidence counts for a period of time. Because the rate of coincidence counts will increase regardless of whether the frequency of Alice's (101_a_) signals is higher or lower than of Bob's (101_b_), an adjustment by Alice (101_a_) may be in the right direction (towards greater indistinguishability) or in the wrong direction (more distinguishable). Therefore, the system is configured to determine whether the adjustment has increased or decreased the rate of coincidence counts, and base future adjustments on the most recently received feedback and based on previous adjustments and associated feedback.

Further, the system may be configured to measure the gradient of the HOM dip, by monitoring how much an adjustment changes the rate of coincidence counts. The adjustment may be quantified in terms of, for example, spectrum, cavity length, or temperature. Varying the magnitude of adjustment based on the gradient may help the system find the local minimum more quickly. For example, if multiple minor adjustments are made which make a significant difference to the rate of coincidence counts, the system may determine that the transmitters are sending qubit signals which are relatively distinguishable, and that therefore a more significant adjustment should be made to find the local minimum. In contrast, if minor adjustments are made and there is a limited effect on the rate of coincidence counts, the system may determine that the transmitters are already sending relatively indistinguishable qubit signals, and that they are towards the local minimum and only minor adjustments to the spectrum of the transmitters need to be made.

Because time and frequency are Fourier conjugate variables and the time-bin pulses used are Fourier limited, the width of the HOM dip along the two dimensions time and frequency is related. That is, if the temporal width of the two pulses is relatively narrow, the width of the HOM dip along the time axis will be narrow, and the HOM dip along the spectral (or frequency) axis will be broad. Conversely, if the two pulses have relatively broad temporal width, the width of the HOM dip along the time axis will be broad, and the HOM dip along the spectral (or frequency) axis will be narrow.

This has two consequences. Firstly, the accuracy of the timing feedback affects the number of coincidence counts. Accurately aligning the temporal component then allows the HOM dip to be used to work toward spectral indistinguishability. In some embodiments, the system may be configured to ensure that the temporal indistinguishability of the qubit signals is above a certain threshold before adjusting the spectrum of one or both of the transmitters (101_a, b_). A measure of temporal indistinguishability may be inversely correlated to the width of the binned distribution.

In other embodiments, the magnitude of the spectral adjustment may be based on spectral and temporal feedback. For example, if the spectrum and the temporal indistinguishability of the transmitted signals are changing simultaneously, the system should ensure that adjustments to the spectrum of the transmitters based on the HOM dip are limited to the spectral contribution.

Secondly, the minimization algorithm may use how the gradient is changing as a function of spectral adjustments (e.g., the second derivative of the HOM dip curve) to determine the magnitude of subsequent adjustments. The minimization algorithm may use theoretical maximum and/or minimum rates of coincidence counts, to determine the magnitude of subsequent adjustments. For example, if an adjustment by x MHz reduced the rate of coincidence counts by 10% of the difference between the current rate of coincidence counts and the theoretical minimum rate of coincidence counts (e.g., if the photons were completely indistinguishable), the system may make a smaller adjustment than if the adjustment reduced the rate of coincidence counts by 20% of the difference between the current rate and the theoretical minimum rate of coincidence counts.

It will be appreciated that for feedback which is sent from the receiver to one or more of the transmitters, the decision of how to change the subsequently transmitted qubit signals may be made at different locations. In this embodiment, this applies to both the spectral feedback and temporal feedback. For example, the receiver may detect that the rate of coincidence counts has increased and send feedback to the transmitter to move the spectrum in the opposite direction. In another embodiment, in response to the same increase in coincidence counts, the receiver may simply send feedback comprising the rate of HOM signals and the transmitter would decide how much and in which direction to move the spectrum of the subsequently emitted qubit signals. Or the decision process could be distributed between the transmitter (101_a, b_) and the receiver (131).

Further, spectral feedback may also be provided by combining coincidence counts with other detection patterns, e.g., erroneous BSM detections in the X-basis. The expected detection patterns at the receiver depend on the qubit signals sent by the transmitters. If an expected detection pattern is not obtained for a given transmitted pair of qubit signals, this corresponds to an erroneous BSM detection. If Alice and Bob (101_a, b_) each emit quantum signals in the X-basis, for example |+⟩ _A and |→⟩ _B, then this can result in a BSM detection at Charlie (131). In the X-basis, the baseline of erroneous BSM detections is 25% when using attenuated laser pulses. This means that when the quantum states of the two interfering quantum signals are prepared perfectly, the lowest percentage of erroneous BSM detections that can be obtained is 25%. A frequency mismatch between the two lasers will cause an increase in the erroneous BSM detections in the X-basis. This is because of the coherence required between the early and late time-bins with a constant relative phase. The transmitters receive feedback based on BSM detections, allowing them to estimate the percentage of erroneous BSM detections for a given sequence of quantum signals. The calculated erroneous BSM detection percentage may be used for spectral feedback by the transmitters, where one or more transmitters may make fine adjustments to the spectrum of the quantum signals, and the process is repeated until the percentage of erroneous BSM detections is minimized. Erroneous BSM detections may be used to perform spectral feedback and control while the system is in continuous operation.

Referring to FIG. 2, FIG. 2 illustrates the method of Establishing a Cryptographic key.

FIG. 2 represents a method of establishing at least a portion of a cryptographic key. In the first step, each transmitter transmits qubit signals (205) within specific time windows, characterized by bases and modes. Signals are temporally spaced and correspond to a basis and mode. After then, the receiver gathers (207) qubit signals from all transmitters. Qubit signals from multiple transmitters are interfered (209) to create an output signal. After, multiple received qubit signals are interfered to produce an output signal, detectors detect the resulting output signal (211) from interference. Further, the output signals are analyzed (213), and the receiver automatically provides spectral feedback (215) to transmitters based on the analyzed information. Transmitters which transmit the qubit signal (205) receive spectral feedback from the receiver based on information analysis (213) and transmitters transmitting qubit signals (205) concurrently adjust subsequent qubit signals based on received feedback (217). The qubit signals are adjusted based on received feedback (217), the part of cryptographic key or cryptographic key is established (219) by using transmitted information about detected output signals.

Although the present invention has been described and illustrated with respect to preferred embodiments and preferred uses thereof, it is not to be so limited since modifications and changes can be made therein which are within the full, intended scope of the invention as understood by those skilled in the art.

We claim:

1. A quantum communication system comprising:

at least two transmitters; and a receiver;

wherein each of the transmitters comprises:

a light source configured to transmit a series of temporally spaced apart qubit signals, each qubit signal being within a respective time window, and corresponding to a basis within a plurality of bases, and a mode within a plurality of modes of the basis; and a transmitter controller configured to control the series of qubit signals emitted by the light source; and the receiver comprising:

an interference device having multiple inputs configured to receive the series of qubit signals from each of the transmitters, and multiple outputs configured to output an output signal based on an interference of the received qubit signals at the interference device; and a plurality of detectors configured to detect the output signal at the multiple outputs of the interference device; and a receiver controller configured to:

transmit information concerning the detected output signals to the transmitters;

provide spectral feedback including information pertaining to a plurality of the detected output signals; and monitor a coincidence rate of simultaneously arriving signals at multiple different detectors, and to provide spectral feedback based on the determined coincidence rate;

wherein the quantum communication system is configured concurrently to:

adjust one or more characteristics of subsequently transmitted qubit signals based on the provided feedback, wherein the characteristics based on spectral similarity of the qubit signals; and facilitate establishment of at least part of a cryptographic key between the transmitters based on the transmitted information concerning the detected output signals, and wherein each transmitter is configured to adjust the central frequency of the emitted qubit signals based on the spectral feedback by an amount, wherein the amount is determined from a deviation of the coincidence rate from a predetermined value.

2. The quantum communication system according to claim 1, wherein the system is configured to make subsequent adjustments to the transmitted qubit signals based on the most recently received feedback, and further based on previous adjustments and associated feedback.

3. The quantum communication system according to claim 1, wherein each light source comprises a laser, and each transmitter is configured to adjust the spectrum of the emitted qubit signals by varying the emission wavelength of the laser.

4. The quantum communication system according to claim 1, wherein each transmitter is configured to adjust the central frequency of the emitted qubit signals by controlling the temperature of the laser.

5. The quantum communication system according to claim 1, wherein the qubit signal exhibits a full-width half maximum of less than 500 ps.

6. The quantum communication system according to claim 1, wherein the qubit signals are conveyed from the transmitter to the receiver through a fiber optic cable.

7. The quantum communication system of claim 1, wherein at least one of the transmitter and receiver controllers incorporates a Field-Programmable Gate Array (FPGA).

8. The quantum communication system of claim 1, wherein feedback is provided on spectral characteristics of the qubit signals, and analysis of the output signals is conducted over distinct respective time periods.

9. The quantum communication system of claim 1, wherein the establishment of the cryptographic key is based on information derived from detected output signals corresponding to Bell states or GHZ states.

10. The quantum communication system of claim 1, wherein the establishment of the cryptographic key is based on information derived from detected output signals corresponding to a photon detected in an early bin at a first detector and a photon detected in a late bin at a second detector.

11. The quantum communication system of claim 1, wherein each qubit signal among the transmitted qubit signals is encoded utilizing early and late time bins within the respective time window.

12. A quantum communication system receiver comprising:

an interference device with multiple inputs configured to receive multiple series of temporally spaced apart qubit signals from multiple transmitters, and multiple outputs configured to output an output signal based on the interference of the received qubit signals at the interference device;

multiple detectors configured to detect the output signal at multiple outputs of the interference device; and a receiver controller configured to:

transmit information concerning the detected output signals to the transmitters;

monitor a coincidence rate of simultaneously arriving signals at multiple different detectors; and, provide spectral feedback based on the outputs and based on the determined coincidence rate, wherein the feedback is derived from information determined through an analysis of a plurality of the detected output signals and pertains to spectral similarity of the qubit signals.

13. A method of establishing at least a portion of a cryptographic key, the method comprising:

transmitting a controlled series of temporally spaced apart qubit signals from each of a plurality of transmitters, each qubit signal being within a respective time window, and corresponding to a basis within a plurality of bases, and a mode within a plurality of modes of the basis;

receiving the qubit signals at a receiver;

interfering multiple received qubit signals from the multiple transmitters to produce an output signal based on an interference of the received qubit signals at the interference device;

monitoring a coincidence rate of simultaneously arriving signals at multiple different detectors;

detecting the output signals; and transmitting information relating to the detected output signals to the transmitters, automatically providing spectral feedback based on information determined from an analysis of a plurality of the detected output signals and based on the determined coincidence rate, wherein the feedback corresponds to spectral characteristics of the qubit signals, the characteristics comprising: spectral similarity of the qubit signals;

concurrently adjusting subsequently transmitted qubit signals based on the received feedback and adjusting the central frequency of the emitted qubit signals by an amount determined from a deviation of the coincidence rate from a predetermined value; and establishing at least part of a cryptographic key between the transmitters based on the transmitted information relating to the detected output signals.

* * * * *